(12) United States Patent
Bremmer et al.

(10) Patent No.: US 10,293,930 B2
(45) Date of Patent: May 21, 2019

(54) SPAR END CAP WITH DRAIN HOLE PROVISIONS

(71) Applicant: Sikorsky Aircraft Corporation, Stratford, CT (US)

(72) Inventors: Jonathan Bremmer, Glastonbury, CT (US); Joseph B. Ozelski, Shelton, CT (US); Mark J. Derienzo, Bethany, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 636 days.

(21) Appl. No.: 14/994,274

(22) Filed: Jan. 13, 2016

(65) Prior Publication Data
US 2016/0229560 A1 Aug. 11, 2016

Related U.S. Application Data

(60) Provisional application No. 62/103,249, filed on Jan. 14, 2015.

(51) Int. Cl.
*B64F 5/10* (2017.01)
*B64C 27/473* (2006.01)
*B64C 27/46* (2006.01)
*B64F 5/40* (2017.01)

(52) U.S. Cl.
CPC .......... *B64C 27/473* (2013.01); *B64C 27/463* (2013.01); *B64F 5/10* (2017.01); *B64F 5/40* (2017.01)

(58) Field of Classification Search
None
See application file for complete search history.

(56) References Cited

U.S. PATENT DOCUMENTS

| | | | | |
|---|---|---|---|---|
| 3,134,445 A | * | 5/1964 | Hotchkiss | B64C 27/007 116/266 |
| 3,316,975 A | * | 5/1967 | Capowich | B64C 27/008 416/226 |
| 4,033,172 A | * | 7/1977 | Flamand | G01M 3/3209 73/37 |
| 4,721,123 A | * | 1/1988 | Cosentino | A61M 25/002 134/113 |
| 5,770,794 A | * | 6/1998 | Davey | B64C 27/007 73/37 |
| 6,979,179 B2 | | 12/2005 | Moller Larsen | |
| 8,678,765 B2 | | 3/2014 | Bendel et al. | |

(Continued)

FOREIGN PATENT DOCUMENTS

EP 2789851 A1 10/2014

*Primary Examiner* — Jason D Shanske
*Assistant Examiner* — Theodore Ribadeneyra
(74) *Attorney, Agent, or Firm* — Cantor Colburn LLP

(57) ABSTRACT

A rotor blade spar for use in a rotor blade is provided comprising a housing defining an interior and having an open end. An end cap is affixed to and sealed on the open end to seal the interior from an exterior outside of the housing. The end cap includes a first port and a second port fluidly coupling the interior to the exterior. A port sealing system closes the first and second ports. The first port is connectable to an external device configured to generate a pressure differential between the interior and the exterior sufficient to create an airflow through the first and second ports which removes a liquid disposed in the housing through one of the first and second ports.

11 Claims, 5 Drawing Sheets

(56) References Cited

U.S. PATENT DOCUMENTS

| | | | | |
|---|---|---|---|---|
| 8,899,936 B2* | 12/2014 | Hancock | ................. | B25B 11/02 29/889.72 |
| 2003/0101798 A1* | 6/2003 | Kendall | ................ | B64C 27/006 73/37 |
| 2009/0035148 A1 | 2/2009 | Livingston et al. | | |
| 2011/0142660 A1* | 6/2011 | Bakhuis | .................... | B60P 3/40 416/223 R |
| 2013/0133199 A1* | 5/2013 | Pasupuleti | ................ | B08B 9/00 29/889.1 |

* cited by examiner

SPAR END CAP WITH DRAIN HOLE PROVISIONS

CROSS-REFERENCE TO RELATED APPLICATIONS

This application claims the benefit of priority of U.S. Provisional Application No. 62/103,249 filed Jan. 14, 2015, the disclosure of which is incorporated by reference.

BACKGROUND OF THE INVENTION

Exemplary embodiments of the invention relate to a rotary wing aircraft, and more particularly, to a method and apparatus for manufacturing a rotor blade of a rotary wing aircraft.

A rotor blade includes a blade spar, which is a hollow cavity providing structural support to the rotor blade. To prevent water from entering the spar, the end of the spar can be sealed. However, water can enter the spar even with a seal. For example, during fabrication, the formation of a fastener hole can allow water to enter the blade spar. Another example would be through a broken seal, or where the blade is stored in a container that has water leaking into it. Water can also come from changes in temperature causing condensation inside the spar. Once the water enters the blade spar, the water becomes trapped in the closed tip of the blade. The water must then be removed since the water can affect the balance of the blade during usage. To remove any water accumulated therein, the sealed end cap of the blade spar must be removed during which potential for damaging the remainder of the blade spar exists.

BRIEF DESCRIPTION OF THE INVENTION

According to one embodiment of the invention, a rotor blade spar for use in a rotor blade is provided comprising a housing defining an interior and having an open end. An end cap is affixed to and sealed on the open end to seal the interior from an exterior outside of the housing. The end cap includes a first port and a second port fluidly coupling the interior to the exterior. A port sealing system closes the first and second ports. The first port is connectable to an external device configured to generate a pressure differential between the interior and the exterior sufficient to create an airflow through the first and second ports which removes a liquid disposed in the housing through one of the first and second ports.

In addition to one or more of the features described above, or as an alternative, in further embodiments the port sealing system comprises a first valve arranged in the first port and a second valve arranged in the second port. The first valve and the second valve are opened when the pressure differential is created and closed when the pressure differential is not created.

In addition to one or more of the features described above, or as an alternative, in further embodiments the external device is configured blow air into the interior.

In addition to one or more of the features described above, or as an alternative, in further embodiments the external device is a vacuum.

In addition to one or more of the features described above, or as an alternative, in further embodiments at least one of the first and second ports includes an opening extending through the end cap and the sealing system comprises a plug removably inserted within the opening. When the plug is removed, the external device may be fluidly coupled to at least one of the first and second port.

In addition to one or more of the features described above, or as an alternative, in further embodiments wherein the sealing system includes a one way valve configured to allow fluid to flow through the first port in a first direction.

In addition to one or more of the features described above, or as an alternative, in further embodiments the first port includes a one way valve configured to allow air to flow into the interior of the object and the second port includes a one way valve configured to allow air and the liquid to flow out of the interior.

According to another embodiment of the invention, a method of removing water from an interior of a rotor blade spar is provided comprising fluidly coupling an external device to an inlet port of an end cap mounted at and sealing an inboard end of the spar. The inlet port is arranged in fluid communication with an interior of the spar. A pressure differential is generated between an exterior of the spar and the interior of the spar such that the water flows from the interior of the spar through an outlet port in the end cap.

In addition to one or more of the features described above, or as an alternative, in further embodiments the external device is configured to blow air into the object.

In addition to one or more of the features described above, or as an alternative, in further embodiments the external device is a vacuum.

In addition to one or more of the features described above, or as an alternative, in further embodiments at least one of the inlet port and the outlet port includes a plug removably inserted within an opening formed in the end cap.

In addition to one or more of the features described above, or as an alternative, in further embodiments removing the plug from a respective opening prior to fluidly connecting the external device to the opening.

In addition to one or more of the features described above, or as an alternative, in further embodiments at least one of the inlet port and the outlet port includes a one way valve.

Technical effects include a rotor blade having minimal water accumulation within an interior thereof.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
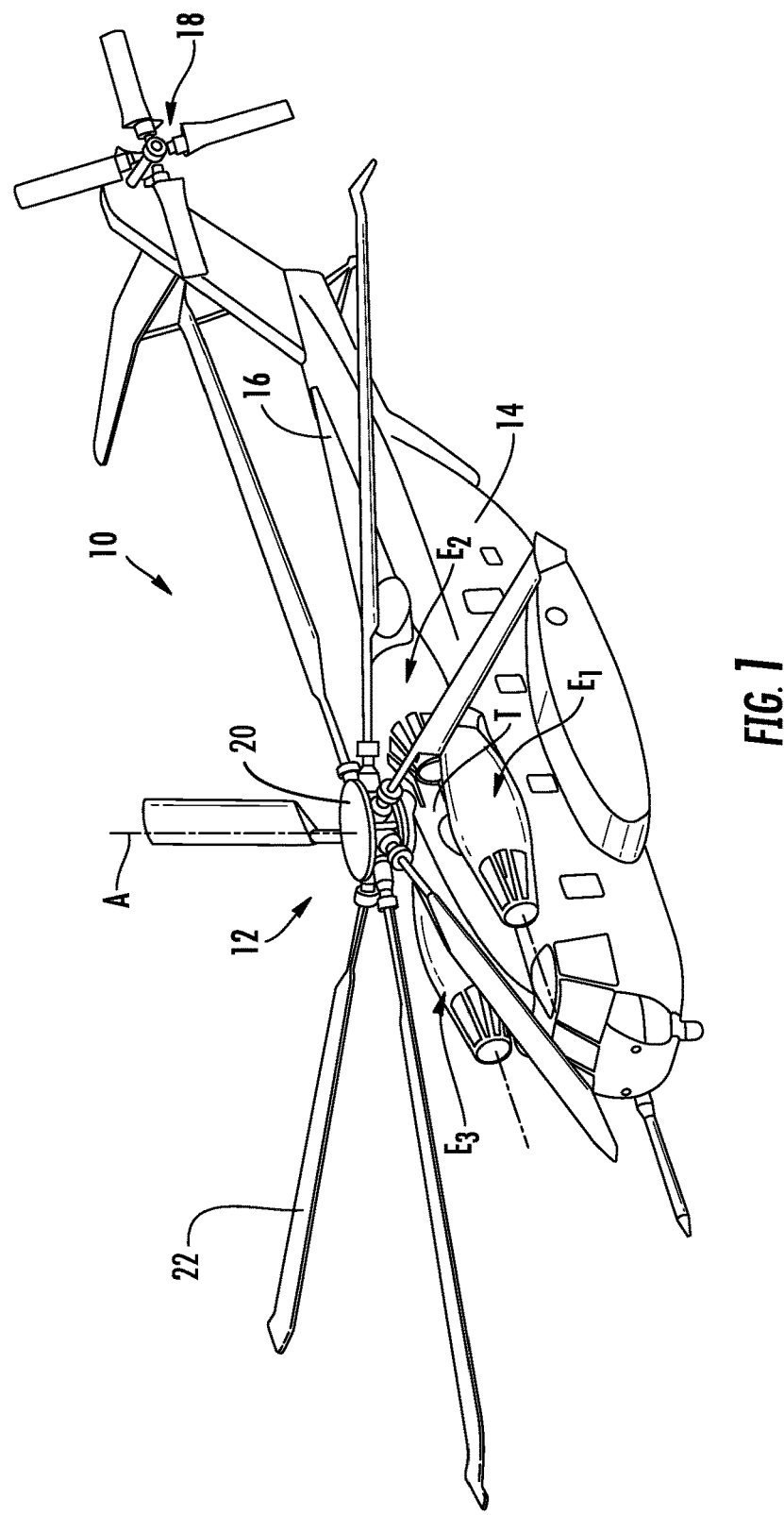
FIG. 1 is a perspective view of an example of a rotary wing aircraft.

FIG. 1 schematically illustrates a rotary wing aircraft 10 having a main rotor assembly 12. The aircraft 10 includes an airframe 14 having an extended tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Figure 2:
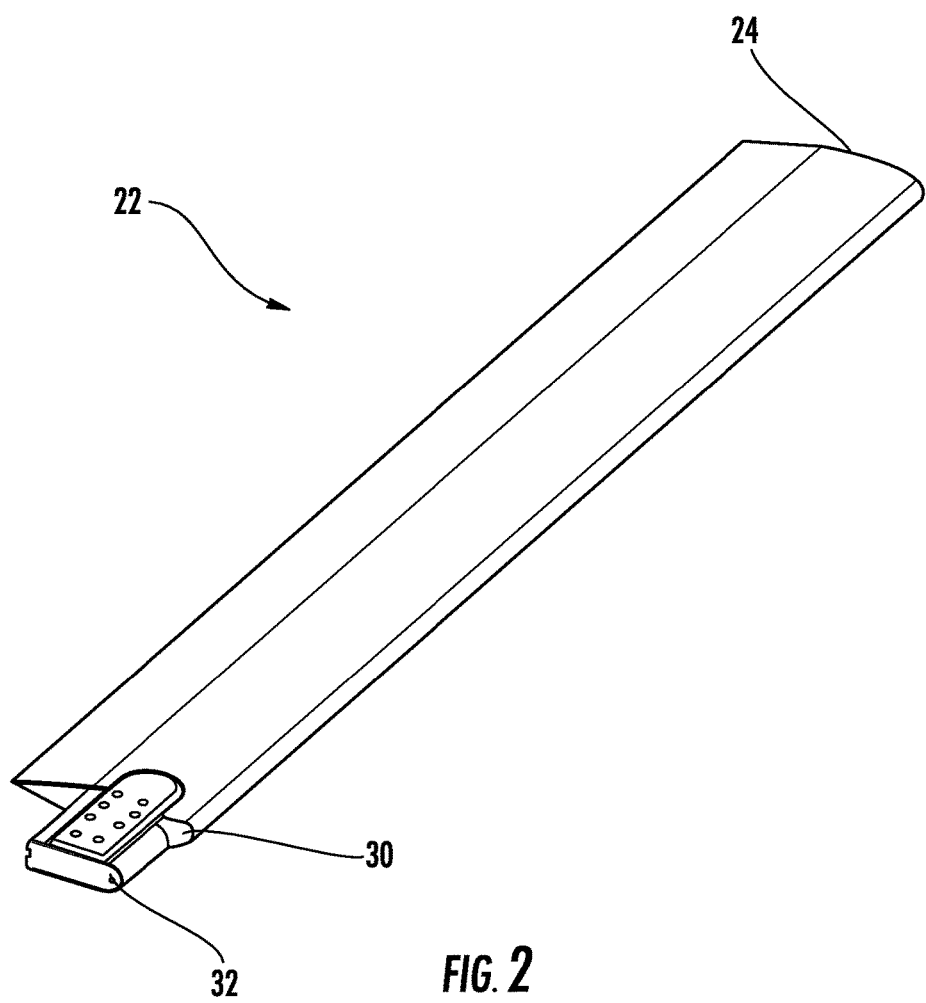
FIG. 2 is perspective view of a rotor blade assembly of a main rotor system of a rotary wing aircraft according to an embodiment of the invention.

Referring now to the example rotor blade assembly 22 illustrated in FIG. 2, a generally hollow, tubular spar 30 configured to couple to the rotor hub 20 at an inboard end 32 extends over at least a portion of the length of the rotor blade assembly 22. In one embodiment, the spar 30 may extend to the outboard end 24 of the rotor blade assembly 22. The cross-section of the spar 30 may, but need not vary in size and shape over the length of the spar 30 depending on the contour of the rotor blade assembly 22. The spar 30 is a structural member having a high torsional and axial stiffness and strength and, therefore, may be made from a high strength material, including but not limited to metal, graphite, fiberglass or some combination thereof.

Figure 3:
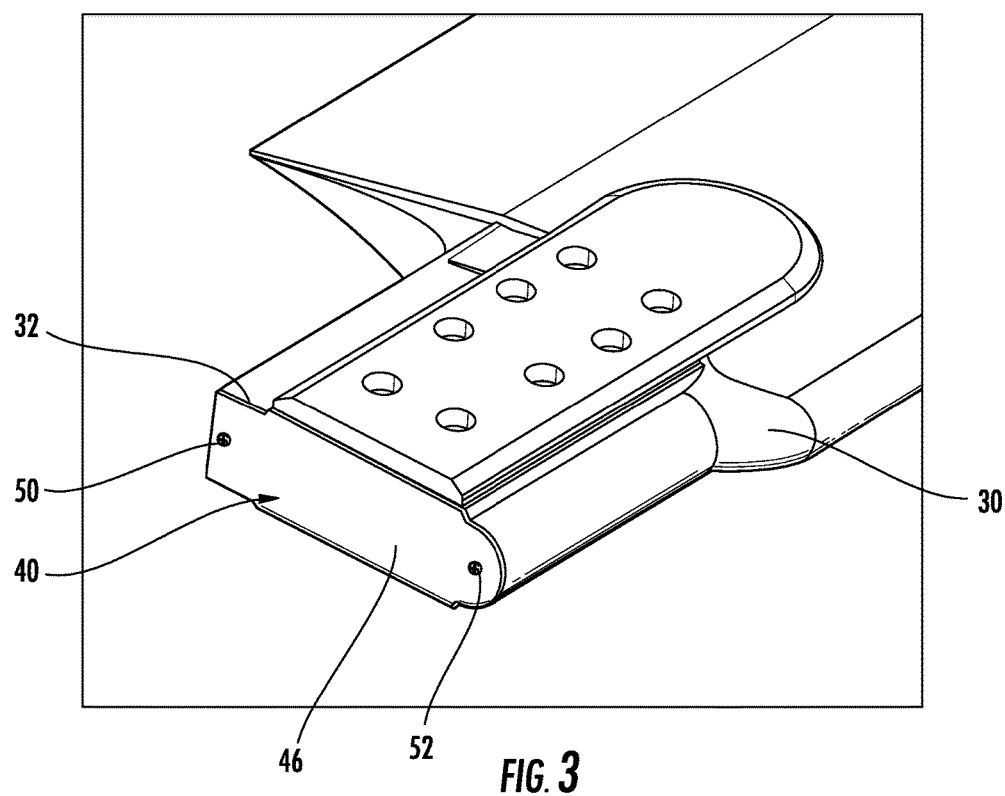
FIG. 3 is a perspective view of a rotor blade assembly having an end cap configured to allow water accumulated within an interior of the rotor blade to be removed according to an embodiment of the invention.
Figure 4:
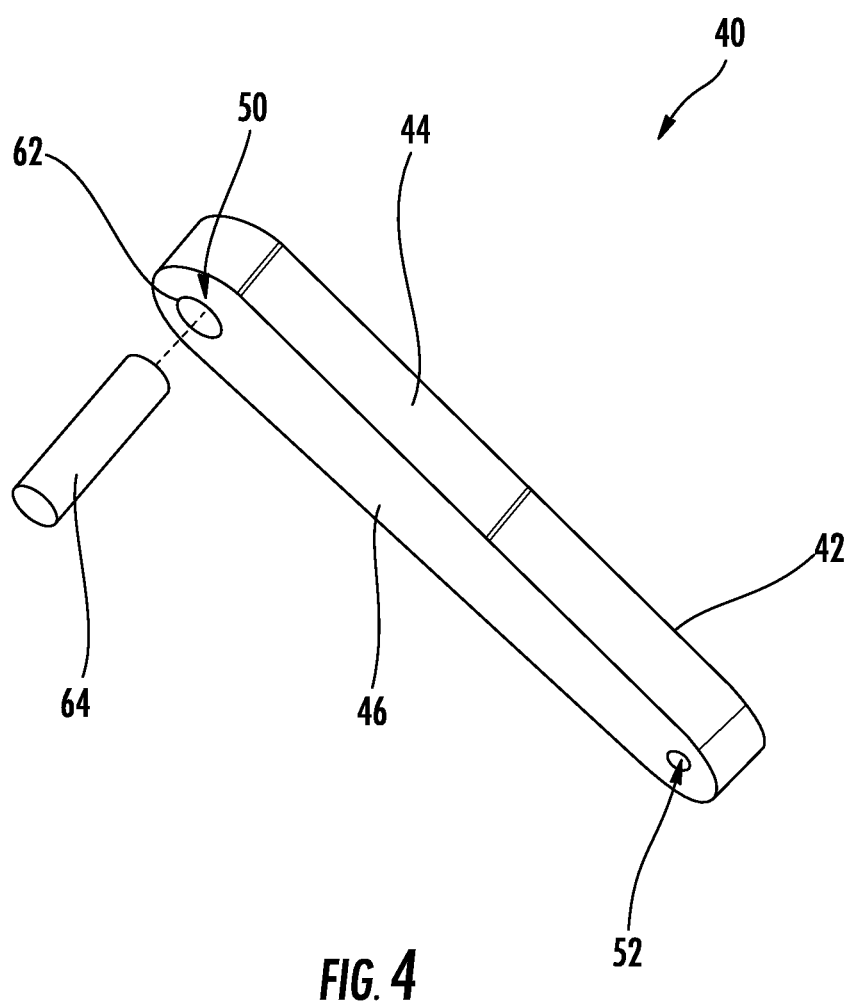
FIG. 4 is a perspective view of an end cap having an inlet port and an outlet port according to an embodiment of the invention.
Figure 5:
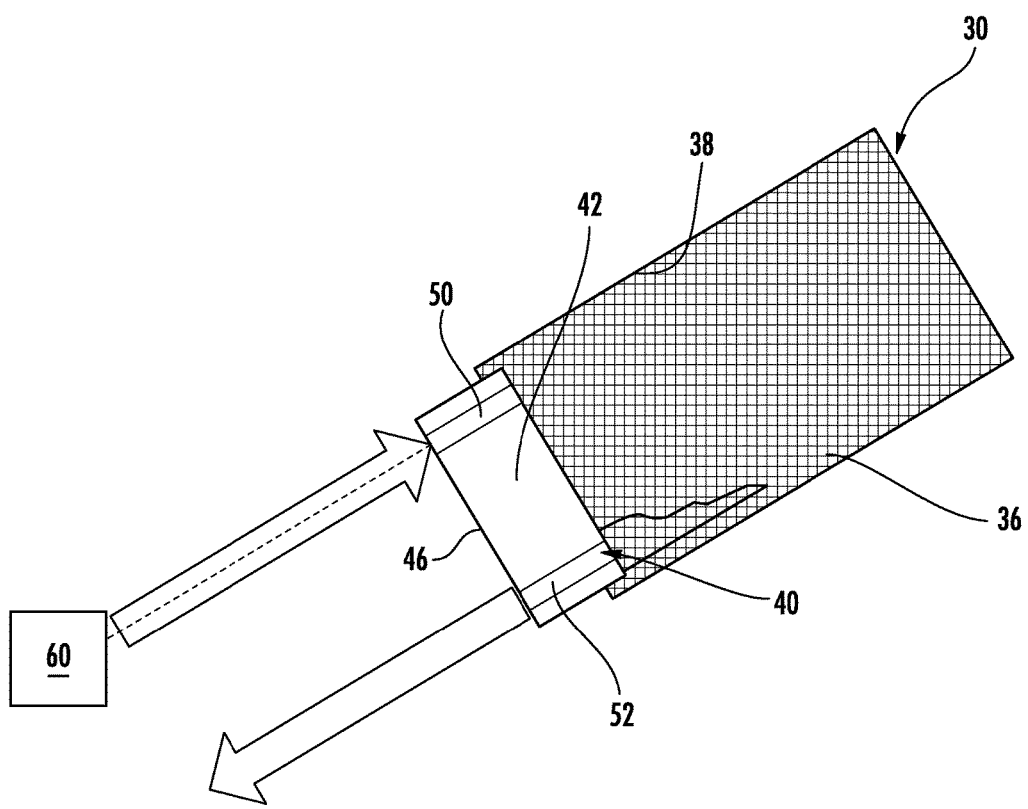
FIG. 5 is a cross-sectional view of a rotor blade assembly including an end cap having an inlet port and an outlet port according to an embodiment of the invention.

Referring now to FIGS. 3-5, when the rotor blade assembly 22 is not attached to the rotor hub 20, an end cap 40 is permanently or removably affixed to the spar 30 to close or seal an end thereof, such as inboard end 32 for example. The end cap 40 has a substantially solid body 42 formed from any suitable material, including but not limited to aluminum, titanium, or a composite for example. The shape of the end cap 40 is generally complementary to an interior (not separately labeled) of the spar 30 such that the end cap 40 may be inserted therein and an exterior surface 46 of the end cap 40 may be bonded to the adjacent interior surface 38 of the spar 30. Alternatively, the end cap 40 may be a plate having a contour generally complementary to an adjacent portion of the spar 30 such that a surface (not shown) of the end cap 40 may directly contact the inboard end 32 of the spar 30. In either embodiment, when the end cap 40 is mounted to the spar 30, a surface of the end cap 40, such as surface 46 for example, is substantially flush with the inboard end 32 of the spar 30. The end cap 40 may be permanently affixed when the rotor blade assembly 22 is connected to the rotor hub 20 in aspects. In other aspects, the end cap 40 may be attached during storage and transportation of the rotor blade assembly 22, and may be removed when the rotor blade assembly 22 is connected to the rotor hub 20.

During manufacturing of a rotor blade assembly 22 having a blade spar 30 with a closed inboard end 32 formed by an end cap 40, water may accumulate inside the spar 30. For example, during drilling or machining of one or more holes in the blade spar 30, water used to cool the manufacturing equipment may be deposited inside the spar 30.

According to an embodiment of the invention, the end cap 40 includes at least one port configured for removing any water accumulated therein. In the illustrated, non-limiting embodiment, the end cap 40 includes an inlet port 50 and an outlet port 52, separated from one another by a distance. Although the inlet port 50 and the outlet port 52 are shown arranged adjacent opposing ends of the end cap 40, embodiments where at least one of the ports 50, 52 is formed near a central portion of the end cap 40 is within the scope of the invention.

An external device 60, such as an air supply for example, may be connected to the inlet port 50 to blow air into the interior 36 of the spar 30. As a result of the pressure difference between the interior 36 and the exterior of the spar 30 generated by the input air, the air and any water accumulated within the spar 30 will flow out of the spar 30 through the outlet port 52. In other embodiments, the external device 60 is a vacuum used to create the pressure differential between the interior 36 and the exterior of the spar 30 such that the water is sucked into the device 60. Orienting the spar 30 at an angle as shown in FIG. 5, such that any water accumulated within the spar 30 is collected adjacent the outlet port 52 will additionally improve the water removal process.

In the embodiment illustrated in FIG. 4, at least one of the inlet port 50 and the outlet port 52 includes an opening 62 extending through the entire thickness of the substantially solid 42 having a removable plug 64 inserted therein. The plug 64 may be formed from any suitable material, such as titanium, aluminum, composite, and PVC for example. In such embodiments, the plug 64 remains installed within the opening 62 during the machining of the blade spar 30 and also during storage and transport when not connected to the rotor hub 20 as well as during operation of the rotary wing aircraft 10. The plug 64 is generally only detached from the end cap 40 when water or other small debris is being removed from the interior 36 of the spar 30. In another embodiment, at least one of the inlet port 50 and the outlet port 52 includes a one-way valve. For example, a one-way valve used as the inlet port 50 would be configured to allow air to flow into, but not out of, the interior 36 of the spar 30, and a one-way valve used as the outlet port 52 would be configured to allow water and air to flow out of the interior 36 of the spar 30. As such, by producing a pressure differential, the air enters the interior 36 via the inlet port 50, and exits the interior 36 along with the water via the outlet port 52.

By forming at least one port 50, 52 within the end cap 40 affixed to the spar 30, any water or other small debris accumulated within the interior 36 of the spar 30 can be easily removed without causing damage to the spar 30. Because the end caps 40 of the spar 30 will no longer need replacing, use of an end cap 40 as described herein during manufacture of the rotor blade assemblies 22 greatly reduces work costs and improves the manufacturing process associated therewith. Although the end cap 40 is illustrated and described herein with respect to a blade spar 30, the end cap 40 may be used to seal the end of any object having a hollow interior and to prevent damage during manufacture thereof, such as for cleaning gas and/or water pipelines, perform plumbing maintenance, or the like.

While the invention has been described in detail in connection with only a limited number of embodiments, it should be readily understood that the invention is not limited to such disclosed embodiments. By way of example, the first housing may be a single piece as opposed to separate first and second portions. Further, while described in terms of water, it is understood that other liquids can be removed from the blade spar. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor blade spar for use in a rotor blade, the rotor blade spar comprising:
    a housing defining an interior and having an open end and a closed end;
    an end cap affixed to the open end to seal the interior from an exterior outside of the housing, the end cap including a first port and a second port fluidly coupling the interior to the exterior; and
    a port sealing system which closes the first and second ports, wherein the first port includes a one-way valve configured to allow liquid to flow into the interior of the housing and the second port includes another one-way valve configured to allow air and liquid to flow out of the interior of the housing;
    wherein the first port is connectable to an external device which generates a pressure differential between the interior and the exterior sufficient to create an airflow through the first and second ports which removes the liquid disposed within the interior of the housing through one of the first or second port.

2. The assembly according to claim 1, wherein the port sealing system comprises a first valve in the first port and a second valve in the second port, the first and second valves being opened when the pressure differential is created and closed when the pressure differential is not created.

3. The assembly according to either claim 1, wherein the external device is configured to blow air into the interior.

4. The assembly according to either claim 1, wherein the external device is a vacuum.

5. The assembly according to claim 1, wherein at least one of the first and second ports includes:
    an opening extending through the end cap; and
    the port sealing system comprises a plug removably inserted within the opening, wherein when the plug is removed, the external device is fluidly coupled to at least one of the first port and the second port.

6. A method of removing water from an interior of a rotor blade spar, comprising:
    fluidly coupling an external device to an inlet port of an end cap mounted at and sealing an outboard end of the spar; the inlet port being arranged in fluid communication with an interior of the spar, and
    generating a pressure differential between an exterior of the spar and the interior of the spar such that the water flows from the interior of the spar through an outlet port in the end cap.

7. The method according to claim 6, wherein the external device is configured to blow air into the interior of the spar.

8. The method according to claim 6, wherein the external device is a vacuum.

9. The method according to claim 6, wherein at least one of the inlet port and the outlet port includes a plug removably inserted within an opening formed in the end cap.

10. The method according to claim 9, further comprising removing the plug from a respective opening prior to fluidly connecting the external device to the inlet port.

11. The method according to claim 6, wherein at least one of the inlet port and the outlet port includes a one-way valve.

* * * * *